(12) United States Patent  
Holly

(10) Patent No.: US 8,581,773 B1  
(45) Date of Patent: Nov. 12, 2013

(54) DUAL FREQUENCY TRANSMITTER

(75) Inventor: Sandor Holly, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 13/241,180

(22) Filed: Sep. 22, 2011

Related U.S. Application Data

(63) Continuation-in-part of application No. 12/579,461, filed on Oct. 15, 2009, now Pat. No. 8,193,966.

(60) Provisional application No. 61/390,062, filed on Oct. 5, 2010.

(51) Int. Cl.
*G01S 13/89* (2006.01)
*G01S 7/282* (2006.01)

(52) U.S. Cl.
USPC ............ 342/22; 342/27; 342/29; 342/179; 342/188; 342/194

(58) Field of Classification Search
USPC ............ 342/22, 27, 29, 179, 188, 191, 194
See application file for complete search history.

(56) References Cited

U.S. PATENT DOCUMENTS

| | | | |
|---|---|---|---|
| 4,595,915 A * | 6/1986 | Close | 340/572.2 |
| 5,083,130 A * | 1/1992 | Cardiasmenos | 342/188 |
| 5,241,321 A | 8/1993 | Tsao | |
| 6,864,825 B2 | 3/2005 | Holly | |
| 6,943,742 B2 | 9/2005 | Holly | |
| 6,950,076 B2 | 9/2005 | Holly | |
| 6,999,041 B2 | 2/2006 | Holly | |
| 7,009,575 B2 | 3/2006 | Holly | |
| 7,142,147 B2 | 11/2006 | Holly | |
| 7,486,250 B2 | 2/2009 | Vetrovec et al. | |
| 2008/0316103 A1* | 12/2008 | Rofougaran et al. | 342/386 |
| 2011/0084869 A1* | 4/2011 | Holly et al. | 342/27 |
| 2011/0090119 A1* | 4/2011 | Holly et al. | 342/368 |

* cited by examiner

*Primary Examiner* — John B Sotomayor
(74) *Attorney, Agent, or Firm* — Caven & Aghevli LLC

(57) ABSTRACT

In embodiments a system to generate a dual frequency, circularly polarized beam of rotating electromagnetic radiation comprises a first radiation source to generate a first radiation beam at a first frequency, a second radiation source to generate a second radiation beam at a second frequency, different from the first frequency, and a tee. In some embodiments the tee receives the first radiation beam and the second radiation beam, outputs a third radiation beam which represents a sum of the first radiation beam and the second radiation beam, and outputs a fourth radiation beam which represents a difference between the first radiation beam and the second radiation beam, wherein the third radiation beam and the fourth radiation beam are separated by a ninety-degree phase shift. The system further comprises a combiner to combine the third and fourth beams to produce an output beam. Other embodiments may be described.

24 Claims, 11 Drawing Sheets

DUAL FREQUENCY TRANSMITTER

RELATED APPLICATIONS

This application is a continuation-in-part (CIP) of U.S. patent application Ser. No. 12/579,461, entitled Wire Detection Systems and Methods to Holly, et al., filed Oct. 15, 2009 now U.S. Pat. No. 8,193,966, the disclosure of which is incorporated herein by reference in its entirety. This application claims priority from Provisional U.S. Patent Application No. 61/390,062, filed Oct. 5, 2010, entitled Dual Frequency Transmitter, the disclosure of which is incorporated herein by reference in its entirety.

FIELD OF THE DISCLOSURE

This invention relates to antennas and transmitters for electromagnetic radiation, and more particularly to configurations for dual frequency transmitters.

BACKGROUND

The ability to detect objects from a remote location may find utility in a variety of applications. For example, in certain aviation applications the ability to detect objects from a remote location may be useful to avoid airborne collisions with the wires. Further, in military applications the ability to detect objects, e.g., wires from a remote location may be useful to avoid hazard such as improvised explosive devices such as bombs which are buried proximate a road.

In general, techniques to detect objects from a remote location may involve directing radiation from one or more radiation sources toward a target location, receiving backscattered radiation from one or more objects in the target location, and analyzing the backscattered radiation to detect one or more objects proximate the target location. Accordingly, techniques to generate and target radiation may find utility.

SUMMARY

In various aspects, radiation beam generators and transmitters which may find utility in systems and method for remote detection are provided. In some embodiments, the systems and methods as described herein generate a rotating radiation field which may be transmitted toward a target location. The target location may be on the ground or in the air and generate an intensity mapping from radiation reflected from the target location. Radiation backscattered from the target location may be collected and analyzed to determine whether an object is present within the target location.

Thus, in one aspect there is provided a method to generate a dual frequency, circularly polarized beam of rotating electromagnetic radiation. The method comprises combining a first radiation beam at a first frequency with a second radiation beam at a second frequency to produce a third radiation beam and a fourth radiation beam. The third radiation beam represents the sum of the first radiation beam and the second radiation beam. The fourth radiation beam represents the difference between the first radiation beam and the second radiation beam. The third radiation beam and the fourth radiation beam are separated by a ninety-degree phase shift. The method further comprises combining the third and fourth beams to produce an output beam.

In another aspect there is provided a system to generate a dual frequency, circularly polarized beam of rotating electromagnetic radiation. In some embodiments the system comprises a first radiation source to generate a first radiation beam at a first frequency, a second radiation source to generate a second radiation beam at a second frequency, different from the first frequency, and a tee. In some embodiments the tee receives the first radiation beam and the second radiation beam, outputs a third radiation beam which represents a sum of the first radiation beam and the second radiation beam, and outputs a fourth radiation beam which represents a difference between the first radiation beam and the second radiation beam, wherein the third radiation beam and the fourth radiation beam are separated by a ninety-degree phase shift. The system further comprises a combiner to combine the third and fourth beams to produce an output beam.

In yet another environment, a method to detect, from a remote location, one or more wires in a target location comprises generating a dual frequency, circularly polarized beam of rotating electromagnetic radiation, directing the dual frequency, circularly polarized beam of rotating electromagnetic radiation at the target location, monitoring radiation from the rotating radiation field reflected from the target location, and generating a signal when the radiation reflected from the target location indicates the presence of a wire in the target location.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Described herein are exemplary wire detection systems and methods. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
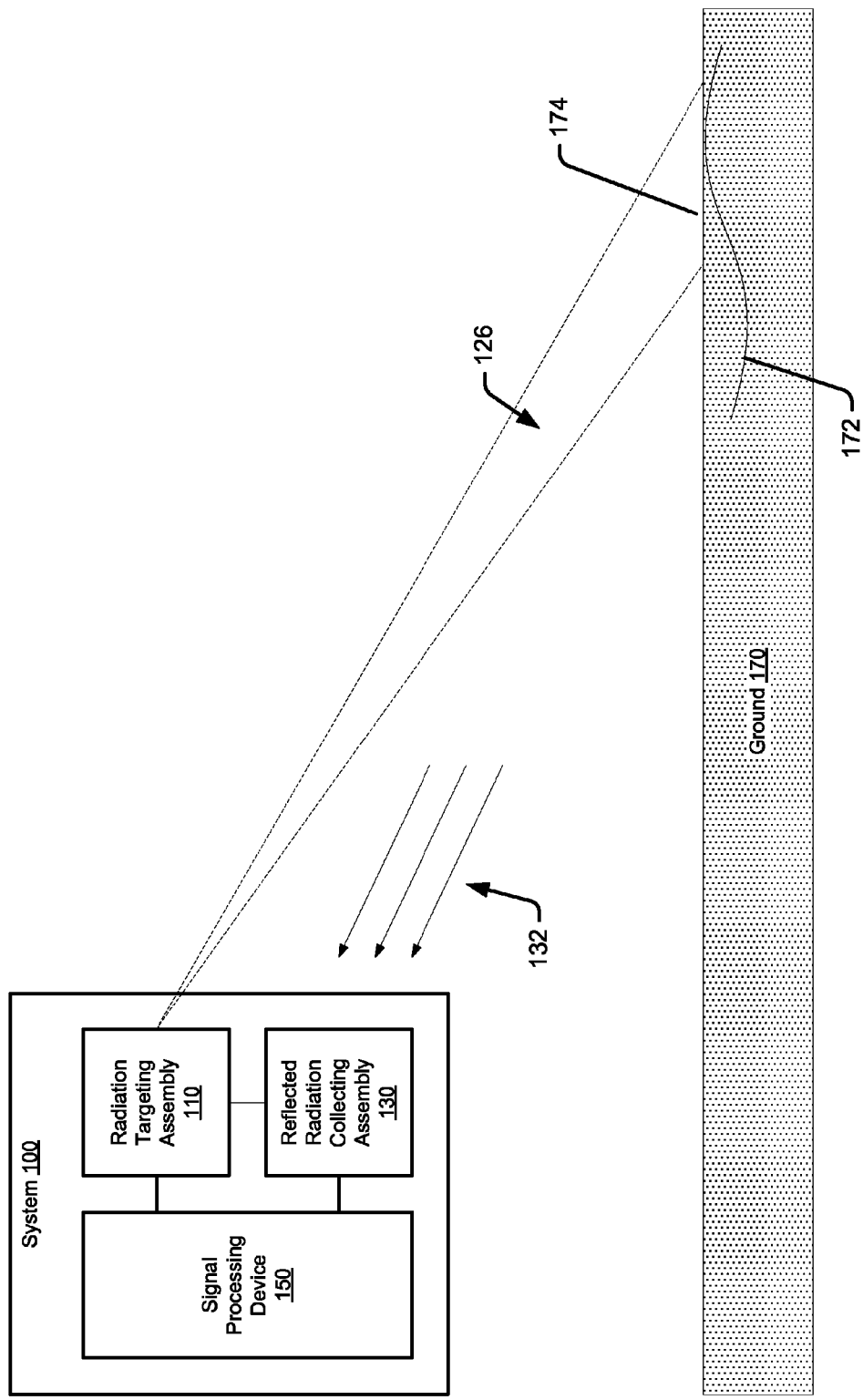
FIG. 1 is a schematic illustration of a wire detection system in accordance with some embodiments.

FIG. 1 is a schematic illustration of a wire detection 100 system in accordance with some embodiments. Referring to FIG. 1, in one embodiment a wire detection system 100 comprises a radiation targeting assembly 110 communicatively coupled to a reflected radiation collecting assembly 130, both of which are communicatively coupled to a signal processing device 150. The particular form of the communication link between the radiation targeting assembly 110, the reflected radiation collecting assembly 130, and the signal processing module 150 is not critical. In some embodiments, these devices may be communicatively coupled by a communication bus, a fiber optical cable, a wireless communication link, or another suitable connection.

By way of overview, in the embodiment depicted in FIG. 1, the radiation targeting assembly 110 directs a radiation field 126 with rotating polarization at a target location 174, on the ground 170. The reflected radiation collecting assembly 130 collects radiation from the ambient environment, including radiation 132 reflected, or backscattered, from the target location 174, and generates signals from the collected radiation. The signals are input to a signal processing device 150, which generates an intensity mapping characteristic of the radiation 132 reflected from the target location 174. At points in time when the polarization of the radiation field 126 is substantially parallel to the wire 172, the wire 172 will backscatter, or reflect, the radiation relatively efficiently. By contrast, when the polarization of the radiation 126 is perpendicular to the wire, the wire will not reflect radiation efficiently. Thus, a wire 172 disposed within the target location 174 will result in a reflection pattern that appears then fades as the polarization of the radiation field 126 rotates between a polarization parallel to the wire and a polarization perpendicular to the wire 172. When such a pattern is detected a signal may be generated, which in turn may be presented on a suitable user interface, e.g., a display or by an audible source such as a speaker.

Figure 2:
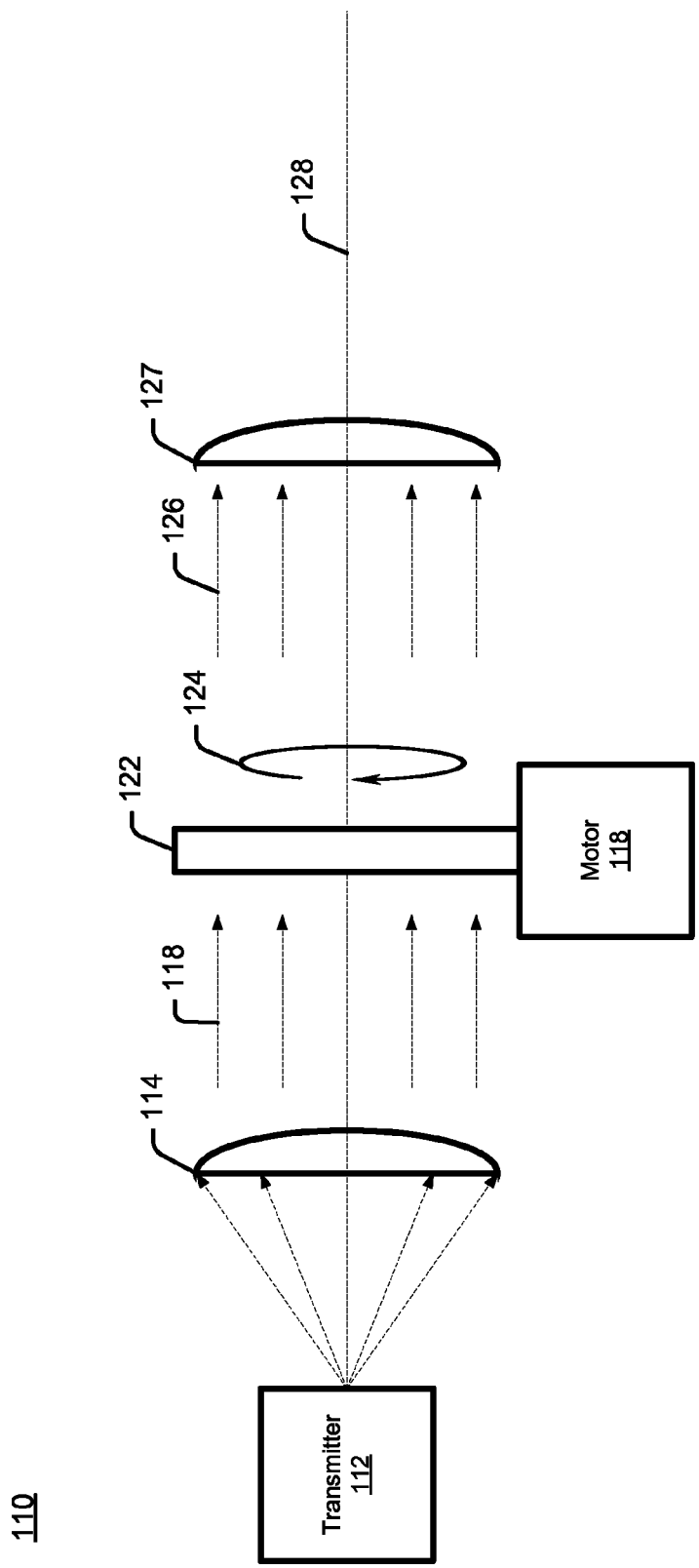
FIG. 2 is a schematic illustration of a radiation targeting assembly in a wire detection system, according to embodiments.

Additional details of the system 100 and its operation are described with reference to FIGS. 2-5. FIG. 2 is a schematic illustration of a radiation targeting assembly 110 in a wire detection system, according to embodiments. In the embodiment depicted in FIG. 2, a radiation targeting assembly 110 comprises a transmitter 112, a collimating lens 114, and a half-wave plate 122 which may be rotated about an axis 128 as indicated by arrow 124 by a motor 118.

Transmitter 112 may be implemented as a radiation source (e.g., a diode, a magnetron, or the like) which generates (operation 510) electromagnetic radiation. The particular wavelength of the radiation is not critical. In general, the wavelength of the radiation should be approximately of the same order of magnitude as the thickness of the wire to be detected. In addition, the wavelength of the radiation should be within a range that remains collimated over the distance from the radiation targeting assembly 110 to the target location. This distance will necessarily differ in different applications. For example, in an embodiment in which the target location is at a distance between 25 meters and 250 meters radiation having a wavelength in the range of 0.5 millimeters to 10 millimeters, and preferably in the range of 3 millimeters to 4 millimeters may be appropriate.

Radiation emitted from the transmitter 112 is directed through a collimating lens 114, which produces a collimated radiation beam (operation 515) as indicated by arrows 118. The collimated radiation beam 118 is directed through a half-wave plate 122, which is rotated about an axis 128 by motor 118, as indicated by arrow 124. Motor 118 may be implemented as a suitable motor, e.g., a servo motor or the like. In some embodiments, the collimated radiation 126 may be directed through an optional focusing lens 127.

In operation, the half-wave plate 122 rotates (operation 520) the polarization of the field between a first orientation and a second orientation, which are orthogonal to one another. The rotation of the half-wave plate causes the polarization of the radiation to change at twice the rate of rotation, i.e., the polarization of the radiation rotates 90 degrees for every 45 degree rotation of the half-wave plate 122. Thus, a rotating, collimated beam of polarized radiation 126 emerges from the half-wave plate 122.

One skilled in the art will recognize that the various components of the radiation targeting assembly 110 may be enclosed in a suitable structure or housing. Further, one skilled in the art will recognize that there are alternate methods to produce a rotating, collimated beam of orthogonally polarized radiation 126. By way of example, and not limitation, the collimating lens 112 may comprise a polarizer, e.g., a thin film, a diffraction grating or the like, which may be rotated about an axis. Alternately, one or more beam splitter polarizers could be used. In other embodiments, the radiation source 112 may produce a polarized radiation beam, and the radiation source 112 may be rotated about an axis. In other embodiments the radiation source 112 may generate a first radiation beam which is sine amplitude modulated and a second radiation beam which is cosine amplitude modulated, and the two orthogonal beams may be combined and passed through a collimating lens 112. The salient feature is to obtain a rotating, collimated beam of polarized radiation 126 emerging from the radiation targeting assembly 110.

The rotating, collimated radiation beam is directed toward the target area 174 depicted in FIG. 1. As indicated in FIG. 1, radiation will be reflected from the wire 172 when the polarization of the incident beam is parallel to the wire (i.e., E field horizontal), while radiation will not be reflected from the wire when the polarization of the incident beam is perpendicular to the wire. Thus, as the polarization of the incident beam rotates, the wire will alternate in time between reflecting radiation and not reflecting radiation.

Figure 3:
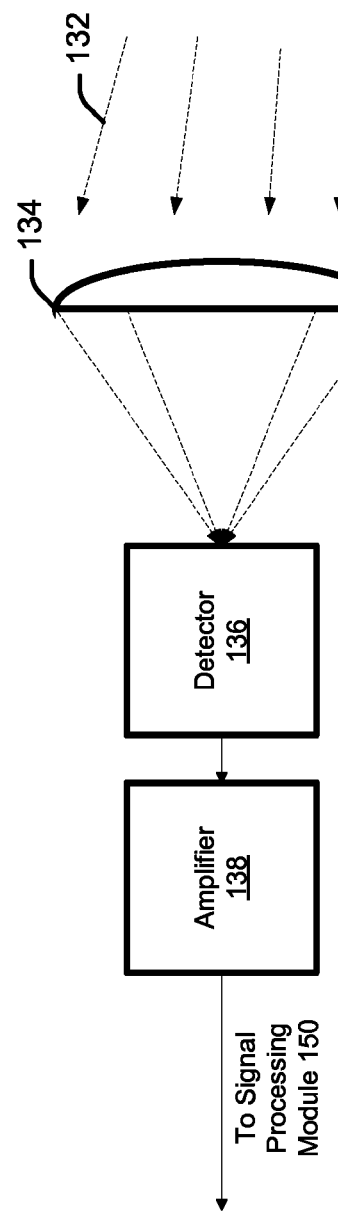
FIG. 3 is a schematic illustration of a reflected radiation collecting assembly in a wire detection system, according to embodiments.

The reflected radiation collecting assembly 130 receives (operation 525) radiation from the ambient environment, including radiation reflected from the target location 172. FIG. 3 is a schematic illustration of a reflected radiation collecting assembly 130 in a wire detection system, according to embodiments. Referring to FIG. 3, reflected radiation collecting assembly 130 receives reflected radiation 132, which is amplitude modulated. A focusing lens 134 focuses (operation 530) radiation from the target zone onto a detector 136. In some embodiments, detector 136 may be implemented as a charge coupled device (CCD), which generates a plurality of output signals corresponding to the intensity of the radiation incident on a cell of the CCD. The output signals may be amplified by an amplifier 138 and directed to the signal processing device 150. In other embodiments, detector 136 may simply be a single diode detector which generates an output signal proportional to the received radiation.

In some embodiments the signal processing device may be implemented as logic instructions which execute on a general purpose processing device, e.g., a computing system. In alternate embodiments the signal processing device 150 may be implemented as in a programmable logic device (e.g., a field programmable gate array) or may be reduced to hardwired circuitry in a dedicated logic device (e.g., an application specific integrated circuit).

Figure 4:
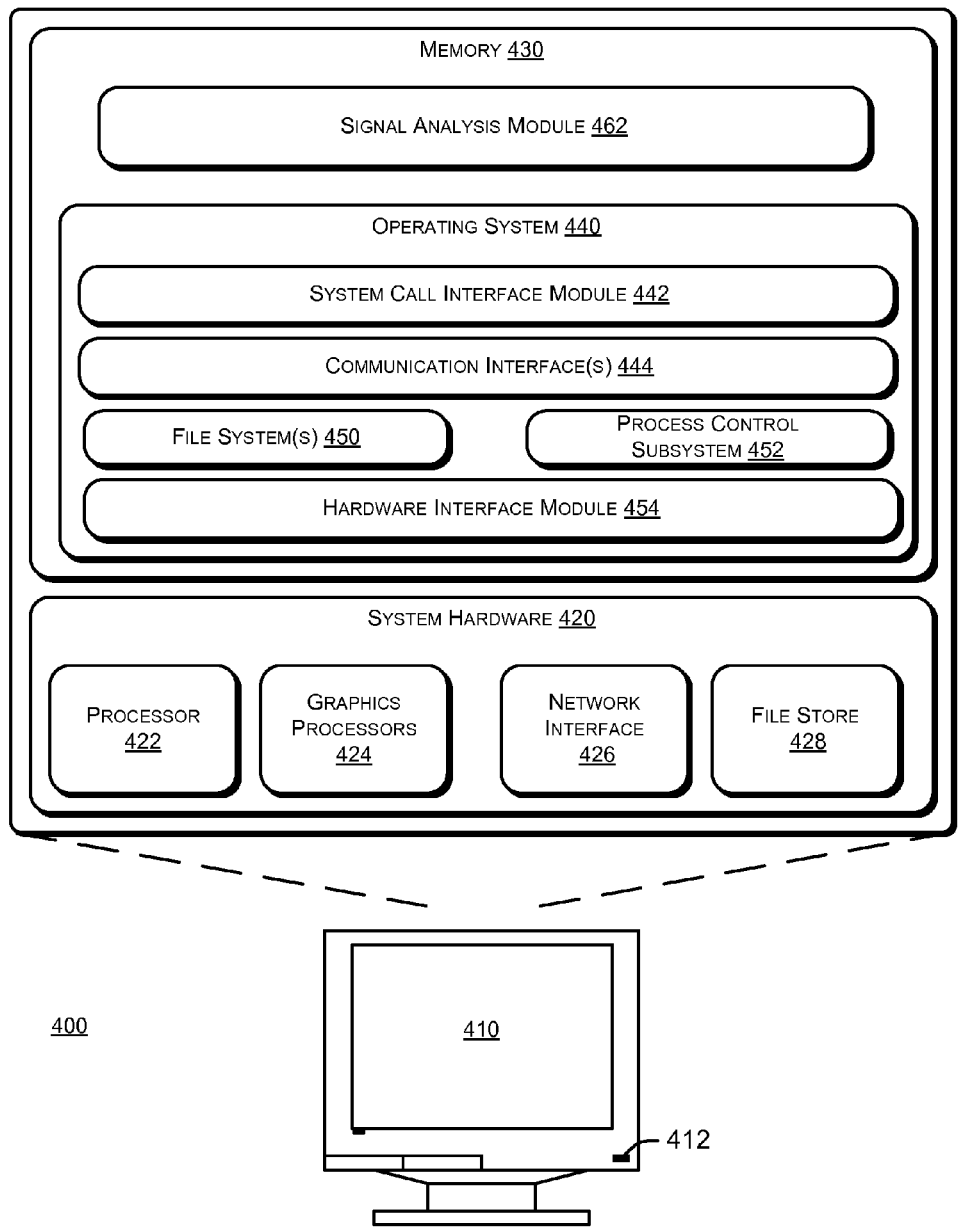
FIG. 4 is a schematic illustration of a computing system in which portions of a system for wire detection may be implemented according to embodiments.
Figure 5:
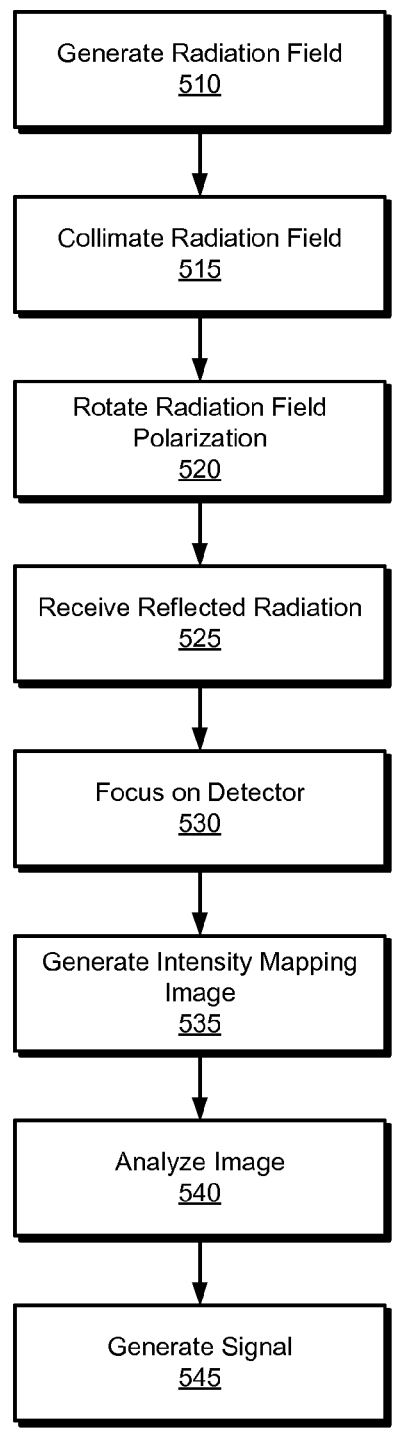
FIG. 5 is a flowchart illustrating operations in a method of wire detection, according to embodiments.

FIG. 4 is a schematic illustration of a computing system in which portions of a system for wire detection may be implemented according to embodiments. In some embodiments, a signal analysis module 462 may be implemented as logic instructions which execute on a general purpose processor, e.g., a computing device. In one embodiment, system 400 includes system hardware 420 and memory 430, which may be implemented as random access memory and/or read-only memory.

System hardware 420 may include one or more processors 422, a graphics processor 424, network interfaces 426, and a file store 428. As used herein, the term "processor" should be construed to include any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor 424 may function as an adjunct processor that manages graphics and/or video operations. Graphics processors 424 may be integrated onto a motherboard of the processing device 400 or may be coupled via an expansion slot on a motherboard.

In one embodiment, network interface 426 could be a wired interface such as an Ethernet interface or a wireless interface such as an IEEE 802.11a, b or g-compliant interface. Another example of a wireless interface would be a general packet radio service (GPRS) interface.

A file store 428 which may be implemented as, e.g., non-volatile memory, one or more hard drives, CD-ROM drives, DVD-ROM drives, or other types of storage devices. File store 428 may also be external to system 400 such as, e.g., one or more external hard drives, network attached storage, or a separate storage network.

System 400 may include, or be coupled to, a display device 410. In some embodiments, display device 410 may comprise a liquid crystal display (LCD) device, a cathode ray tube (CRT) device, or the like. Display 410 may comprise, or be coupled to, one or more auditory interfaces, e.g., a speaker 412.

Memory 430 may include an operating system 440 for managing operations of system 400. In one embodiment, operating system 440 includes a hardware interface module 454 that provides an interface to system hardware 220. In addition, operating system 440 may include a file system 450 that manages files used in the operation of system 400 and a process control subsystem 452 that manages processes executing on system 400.

Operating system 440 may include (or manage) one or more communication interfaces 444 that may operate in conjunction with system hardware 420 to receive data packets and/or data streams from a remote source. Operating system 440 may further include a system call interface module 442 that provides an interface between the operating system 440 and one or more application modules resident in memory 430. Operating system 440 may be embodied as a UNIX operating system or any derivative thereof (e.g., Linux, Solaris, etc.) or as a Windows® brand operating system, or other operating systems.

In one embodiment, memory 430 includes a signal analysis module 462 to evaluate at least one signal characteristic of a signal transmitted from the reflected radiation collecting assembly 110. In one embodiment, a signal analysis module 462 may include logic instructions encoded in a computer-readable storage medium which, when executed by processor 422, cause the processor 422 to analyze one or more signal characteristics to determine whether the reflected signal has signal characteristics which indicate that a wire is present within the target zone 174.

In one embodiment the signal processing module 462 generates (operation 535) an image which represents an intensity mapping of the rotating radiation field reflected from the target location 174. The image may be presented on a display device, such as display 410. Alternately, the image may be stored in a computer readable medium, e.g., as an array of values representative of the CCD signals generated by the detector 136. The image may then be analyzed (operation 540) for a pattern which might indicate the presence of a wire. By way of example, in one embodiment the signal processing module may compute an average intensity reading of the values in a given array. The average intensity reading may be representative of the background noise radiation level received by the reflected radiation collecting assembly 130. The signal processing module 462 may then scan the array may for values which exceed the average intensity reading by a threshold amount. If the intensity reading associated with a sufficient number of data points in the array exceeds a threshold, then the signal processing module 462 may generate a signal (operation 545) which indicates that a wire is present.

Figure 6:
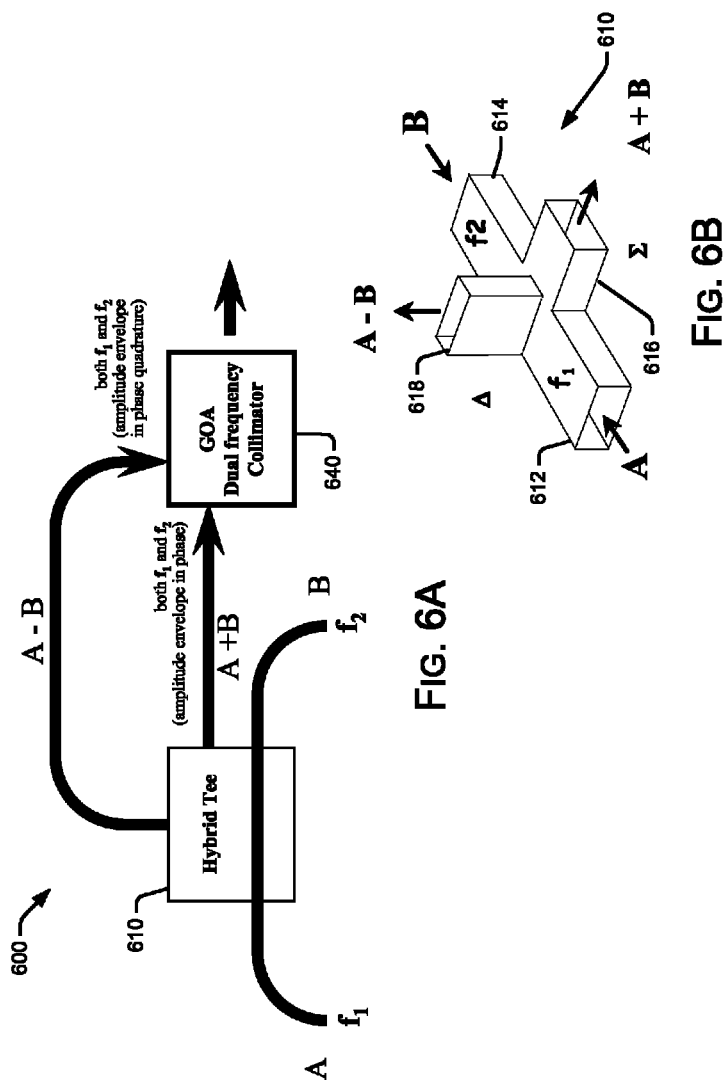
FIG. 6A is a schematic illustration of a system to generate a dual frequency, circularly polarized beam of electromagnetic radiation, according to embodiments.
FIG. 6B is a schematic illustration of a hybrid tee which may be used to combine a first and second radiation beam, according to embodiments.

In the embodiment depicted in FIG. 2 a half-wave plate 122 may be rotated about a central axis 128 by a motor 118 to produce a rotating field of polarized radiation. In some embodiments a beam forming assembly may be used to generate a rotating field of polarized radiation. A schematic illustration of such a beam forming assembly is depicted in FIGS. 6A and 6B. Referring to FIG. 6A, in some embodiments radiation from a first radiation source at a first frequency f1 and radiation from a second radiation source at a second frequency f2 are input into a hybrid tee 610, which generates two outputs from the inputs. FIG. 6B is a schematic illustration of a hybrid tee which may be used to combine a first and second radiation beam, according to embodiments. Referring briefly to FIG. 6B, in some embodiments a hybrid tee 610 receives a first radiation beam indicated by the reference A from a first radiation source at a first input 612. A second radiation beam indicated by the reference B from a second radiation source is received in a second input 614. The hybrid tee 610 combines the two input radiation beams to produce a third radiation beam at an output 616 which represents a sum of the first radiation beam and the second radiation beam, i.e., A+B. The hybrid tee 610 also combines the two input radiation beams to produce a fourth radiation beam at an output 618 which represents a difference of the first radiation beam and the second radiation beam, i.e., A-B. Referring back to FIG. 6A, the outputs of the hybrid tee 610 are input into a collimator 640, where the output beams are combined to produce an output beam, which may be projected toward a target area as described above. Collimator 640 can be a Gaussian Optical Antenna (GOA) model collimator commercially available from Millitech, Inc., Northampton, MA, USA.

Figure 7:
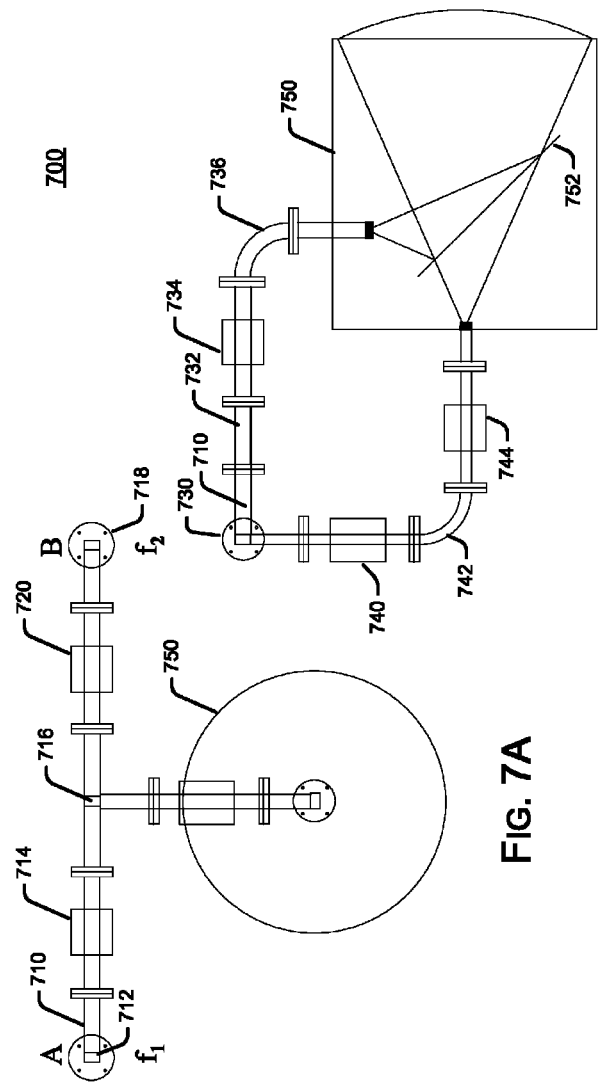
FIGS. 7A and 7B are schematic illustration of a system to generate a dual frequency, circularly polarized beam of radiation, according to embodiments.

FIGS. 7A and 7B are schematic illustrations of a system to generate a dual frequency, circularly polarized beam of radiation, according to embodiments. As described with reference to FIGS. 6A and 6B, a first radiation beam A at a first frequency f1 is input into a waveguide 710. Referring to FIGS. 7A and 7B, the first radiation beam A is directed through an h-plane bend 712 in the waveguide 710. In addition, the first radiation beam may pass through one or more isolators 714 before being input into the hybrid tee 716. Similarly, a second radiation beam B at a second frequency f2 is input into waveguide 710 and is directed through an h-plane bend 718 in the waveguide 710. In addition, the second radiation beam may pass through one or more isolators 720 before being input into the hybrid tee 716.

Referring now to FIG. 7B, one of the outputs from the hybrid tee 716 are directed through isolator 730 and into waveguide 710. Optionally, waveguide 710 may comprise one or more phase adjustors 732 and subsequent isolators 734 before the radiation is directed through an E plane bend 736 and into a collimator 750. Similarly, the other output from the hybrid tee is directed through an isolator 730 and into waveguide 710. Optionally, waveguide 710 may comprise one or more phase adjustors 740 before the radiation is directed through an H plane bend 742, through an isolator 744 and into a collimator 750. Collimator 750 comprises a polarizer 752. In one embodiment the polarizer 752 may be implemented as a grid polarizer.

Figure 8:
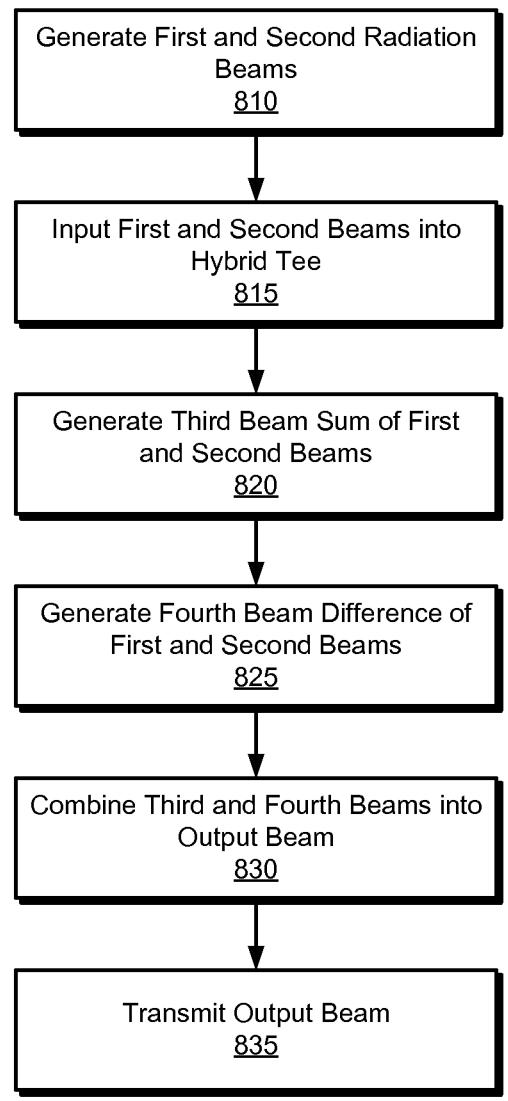
FIG. 8 is a flowchart illustrating operations in a method to generate a dual frequency, circularly polarized beam of radiation, according to embodiments.
Figure 9:
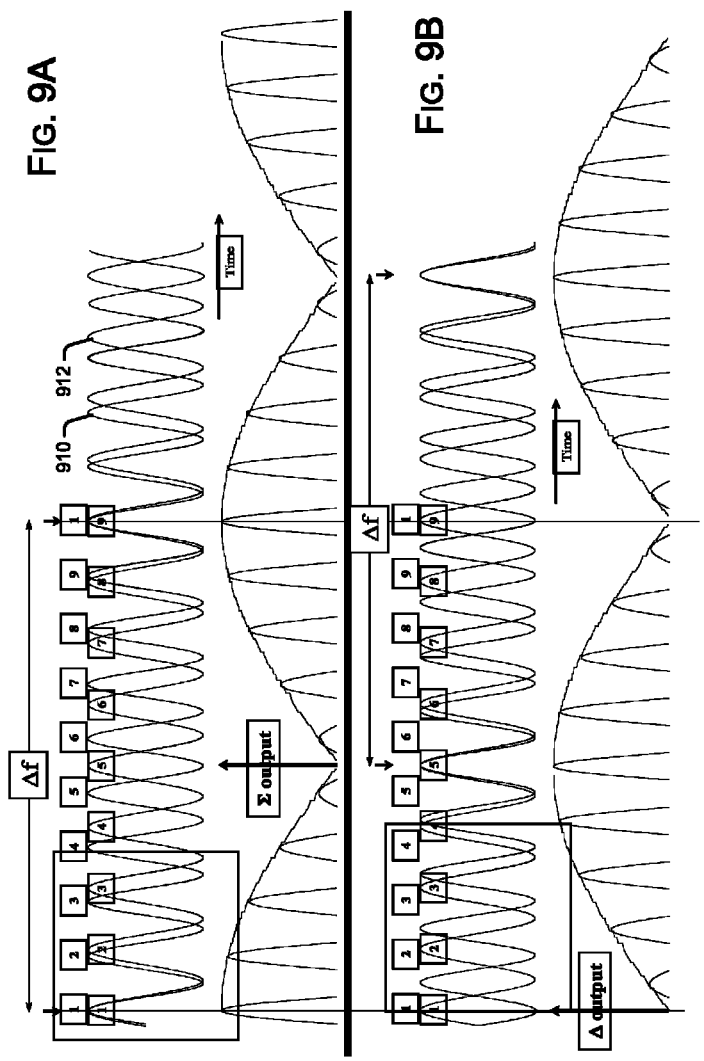
FIGS. 9A and 9B are schematic illustrations of a waveform for a dual frequency, circularly polarized beam of electromagnetic radiation, according to embodiments.

Having described structural components of a system to generate a dual frequency, circularly polarized beam of radiation, according to embodiments, attention will now be turned to operational aspects of such a system. Operational aspects will be described with reference to FIGS. 8-11. FIG. 8 is a flowchart illustrating operations in a method to generate a dual frequency, circularly polarized beam of radiation, according to embodiments.

Referring to FIG. 8, at operation 810 first and second radiation beams are generated by respective first and second radiation sources. As described above, radiation sources may be implemented as, e.g., a diode, a magnetron, or the like which generates electromagnetic radiation. The particular wavelength of the radiation is not critical. In general, the wavelength of the radiation may be in the range of 0.5 millimeters to 10 millimeters, and preferably in the range of 3 millimeters to 4 millimeters may be appropriate. The first and second radiation beams may be input into the waveguide 710. In addition, in some embodiments first radiation beam has a frequency f1 and the second radiation beam has a frequency f2, which differs from the frequency f1.

The first and second radiation beams travel their respective paths along the waveguide 710 and, at operation 815, the first and second radiation beams are input into the hybrid tee 716. At operation 820 the hybrid tee 716 generates a third beam that corresponds to the sum of the first and second beams and at operation 825 the hybrid tee generates a fourth beam that is the difference of the first and second beams. The third and fourth beams may be combined (operation 830) and transmitted as an output beam (operation 835).

Operation of the hybrid tee 716 may be illustrated with reference to FIGS. 9A and 9B, which are schematic illustrations of waveform for a dual frequency, circularly polarized beam of electromagnetic radiation, according to embodiments. Referring first to FIG. 9A, as described above in some embodiments the first radiation beam has a frequency f1 and the second radiation beam has a frequency f2, which differs from the frequency f1. In the embodiment depicted in FIG. 9A the wavelengths are separated by approximately 10% such that the wave forms synchronize every tenth cycle for the first radiation beam 910 and every ninth cycle for the second radiation beam 912. Further, in the embodiment depicted in FIG. 9A the first and second radiation beams have substantially the same amplitude.

FIG. 9A depicts the operation of hybrid tee 716 as it pertains to the output which produces the sum of the first and second radiation beams input to the hybrid tee 716. As illustrated in FIG. 9A, the output which represents the sum of the first and second radiation beams produces a semi-sinusoidal wave which has a peak which occurs when the first radiation beam and the second radiation beam are in-phase and a minimum which occurs when the first radiation beam and the second radiation beam are out of phase. The output signal includes both the first and the second input signals.

FIG. 9B depicts the operation of hybrid tee 716 as it pertains to the output which produces the difference of the first and second radiation beams input to the hybrid tee 716. As illustrated in FIG. 9B, the output which represents the difference of the first and second radiation beams produces a semi-sinusoidal wave is phase-shifted by 90 degrees from the output which represents the sum of the first and second radiation beam. Conceptually, the difference output may be considered a sum of the first and second input beams in which one of the input beams has been phase-shifted by 180 degrees.

Referring back to FIG. 8, at operation 830 the third and fourth beams are combined into an output beam. In some embodiment the third and fourth beams are input into the collimator 750 at with the 90 degree phase shift between the beams.

Figure 10:
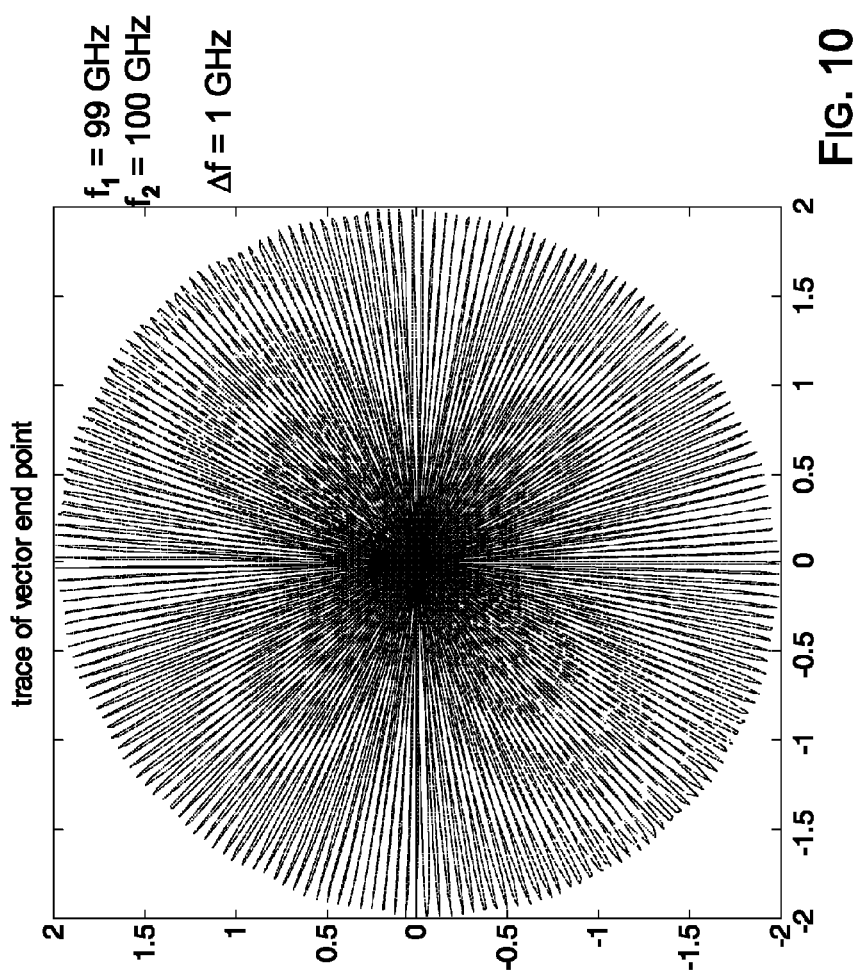
FIGS. 10 and 11 are schematic illustrations of traces of the E field vector end point of the output beam emitted from the system in accordance with embodiments.
Figure 11:
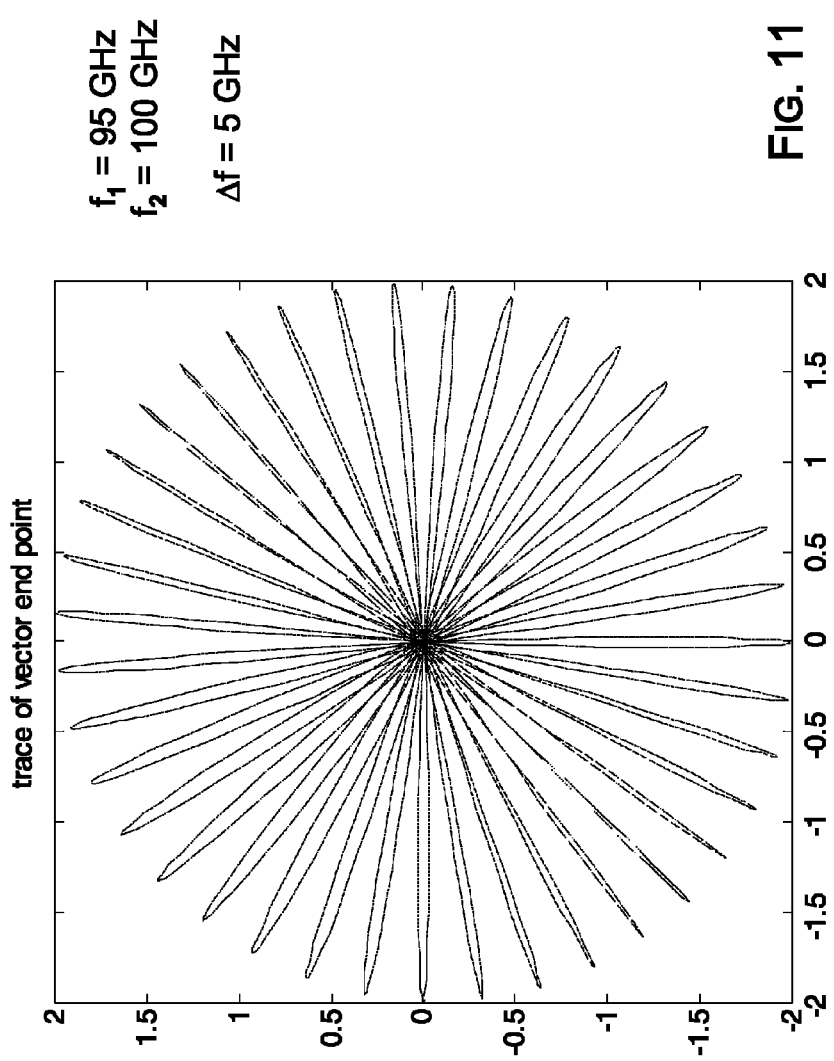

The output beam generated in the collimator 750 will be circularly polarized and will have a rotating E field vector which rotates at a rate that corresponds to the difference between the frequency f1 of the first radiation beam and the frequency f2 of the second radiation beam. FIGS. 10 and 11 are traces of the E field vector end point of the output beam emitted from the collimator 750. The vector illustrated in FIG. 10 results from inputs in which the first radiation beam has a frequency of 99 GHz and the second radiation beam has a frequency of 100 GHz, such that the difference is approximately 1 GHz. Similarly, the vector illustrated in FIG. 11 results from inputs in which the first radiation beam has a frequency of 95 GHz and the second radiation beam has a frequency of 100 GHz, such that the difference is approximately 5 GHz.

Thus, described herein are systems and methods to produce a dual frequency, circularly polarized beam of electromagnetic energy which has a rotating E field vector. The system described with reference to FIGS. 6-11 may be used as a radiation source in the wire detection system described with reference to FIGS. 1-5, thereby eliminating the need for moving parts such as the motor 118 and the half-wave plate 122. The complete system may be used to direct a rotating field of electromagnetic radiation toward a target location and uses radiation reflected from the target location to determine whether an object, e.g., a wire may be present in the target location.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to generate a dual frequency, circularly polarized beam of rotating electromagnetic radiation, the method comprising:

combining a first radiation beam at a first frequency with a second radiation beam at a second frequency to produce a third radiation beam and a fourth radiation beam, wherein:

the third radiation beam represents the sum of the first radiation beam and the second radiation beam;

the fourth radiation beam represents the difference between the first radiation beam and the second radiation beam;
the third radiation beam and the fourth radiation beam are separated by a ninety-degree phase shift; and
the third and fourth beams combine to produce an output beam.

2. The method of claim 1, further comprising transmitting the output beam at a target location.

3. The method of claim 2, wherein combining the first radiation beam and the second radiation beam comprises inputting the first radiation beam and the second radiation beam into a hybrid tee.

4. The method of claim 3, wherein the hybrid tee outputs the third radiation beam and the fourth radiation beam.

5. The method of claim 1, wherein the third and fourth beams are combined in a collimator to produce parallel beams.

6. The method of claim 5, wherein the third and fourth beams are input into the collimator with orthogonal polarizations.

7. The method of claim 2, wherein the output beam is circularly polarized and comprises a rotation rate corresponding to a difference between the first frequency and the second frequency.

8. The method of claim 2, further comprising:
receiving a backscatter radiation reflected from the target location; and
generating a signal in response to one or more characteristics of the backscatter radiation.

9. The method of claim 8, further comprising:
collecting a portion of the radiation from the rotating radiation field reflected from the target location; and
focusing the radiation onto a detector.

10. The method of claim 9, further comprising:
generating an image which represents an intensity mapping of the rotating radiation field reflected from the target location; and
monitoring the image for an intensity pattern which represents an object.

11. A system to generate a dual frequency, circularly polarized beam of rotating electromagnetic radiation, the system comprising:
a first radiation source to generate a first radiation beam at a first frequency;
a second radiation source to generate a second radiation beam at a second frequency, different from the first frequency;
a tee to:
receive the first radiation beam and the second radiation beam;
output a third radiation beam which represents a sum of the first radiation beam and the second radiation beam;
output a fourth radiation beam represents a difference between the first radiation beam and the second radiation beam, wherein the third radiation beam and the fourth radiation beam are separated by a ninety-degree phase shift; and
a combiner to combine the third and fourth beams to produce an output beam.

12. The system of claim 11, further comprising a transmitter to transmit the output beam at a target location.

13. The system of claim 12, further comprising:
a first isolator interposed between the first radiation source and a first input of the hybrid tee; and
a second isolator interposed between the second radiation source and a second input of the hybrid tee.

14. The system of claim 13, wherein the hybrid tee outputs the third radiation beam and the fourth radiation beam from separate outputs.

15. The system of claim 11, wherein the combiner comprises a collimator.

16. The system of claim 15, wherein the third and fourth beams are input into the collimator with orthogonal polarizations.

17. The system of claim 12, wherein the output beam transmitted from the transmitter is circularly polarized and comprises a rotation rate corresponding to a difference between the first frequency and the second frequency.

18. The system of claim 12, further comprising:
a receiver to receive a backscatter radiation reflected from the target location; and
a signal processing device to generating a signal in response to one or more characteristics of the backscatter radiation.

19. The system of claim 18, wherein the receiver:
collects a portion of the radiation from the rotating radiation field reflected from the target location; and
focuses the radiation onto a detector.

20. The system of claim 19, further comprising:
an image processor to generate an image which represents an intensity mapping of the rotating radiation field reflected from the target location; and
a signal analysis module to monitor the image for an intensity pattern which represents an object.

21. A method to detect, from a remote location, one or more wires in a target location, comprising:
generating a dual frequency, circularly polarized beam of rotating electromagnetic radiation;
directing the dual frequency, circularly polarized beam of rotating electromagnetic radiation at the target location;
monitoring radiation from the rotating radiation field reflected from the target location; and
generating a signal when the radiation reflected from the target location indicates the presence of a wire in the target location.

22. The method of claim 21, wherein generating a dual frequency, circularly polarized beam of rotating electromagnetic radiation comprises:
combining a first radiation beam at a first frequency with a second radiation beam at a second frequency to produce a third radiation beam and a fourth radiation beam, wherein:
the third radiation beam represents the sum of the first radiation beam and the second radiation beam;
the fourth radiation beam represents the difference between the first radiation beam and the second radiation beam;
the third radiation beam and the fourth radiation beam are separated by a ninety-degree phase shift; and
the third and fourth beams combine to produce an output beam.

23. The method of claim 22, further comprising directing the output beam through at least one focusing lens.

24. The method of claim 22, wherein the output beam is circularly polarized and comprises a rotation rate corresponding to a difference between the first frequency and the second frequency.

* * * * *